United States Patent
Henderson

(10) Patent No.: US 9,342,977 B2
(45) Date of Patent: May 17, 2016

(54) METHOD AND APPARATUS FOR MOBILE DEVICE SECURITY

(71) Applicant: AT&T Intellectual Property I, L.P., Atlanta, GA (US)

(72) Inventor: Donnie Henderson, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/053,351

(22) Filed: Oct. 14, 2013

(65) Prior Publication Data

US 2014/0038555 A1    Feb. 6, 2014

Related U.S. Application Data

(63) Continuation of application No. 13/447,967, filed on Apr. 16, 2012, now Pat. No. 8,559,924.

(51) Int. Cl.
| | |
|---|---|
| H04M 1/66 | (2006.01) |
| G08B 27/00 | (2006.01) |
| H04B 5/00 | (2006.01) |
| H04W 12/02 | (2009.01) |
| H04W 12/08 | (2009.01) |
| H04W 12/12 | (2009.01) |

(52) U.S. Cl.
CPC ............ *G08B 27/006* (2013.01); *H04B 5/0062* (2013.01); *H04W 12/02* (2013.01); *H04W 12/08* (2013.01); *H04W 12/12* (2013.01)

(58) Field of Classification Search
CPC ....... G06F 21/31; G06F 21/35; H04L 63/105; G07C 9/00111; H04M 2250/04; H04M 2250/14; H04M 11/04; H04W 12/06; H04W 4/008; G08B 13/1427; G08B 21/24; G08B 25/016; G08B 13/2462; G08B 21/0275; G08B 25/001; G06K 2017/0045

USPC .................................................. 455/410, 411

See application file for complete search history.

(56) References Cited

U.S. PATENT DOCUMENTS

| | | | |
|---|---|---|---|
| 8,363,086 B1 * | 1/2013 | Shah .......................... | 348/14.02 |
| 8,559,924 B1 | 10/2013 | Henderson | |
| 2005/0020300 A1 | 1/2005 | Chien | |
| 2007/0017983 A1 * | 1/2007 | Frank et al. ................... | 235/385 |
| 2007/0223432 A1 * | 9/2007 | Badarinath ................... | 370/338 |
| 2009/0058670 A1 * | 3/2009 | Sweeney et al. ........... | 340/686.1 |
| 2010/0114958 A1 | 5/2010 | Korenshtein | |
| 2010/0156624 A1 * | 6/2010 | Hounsell ................... | 340/539.1 |
| 2010/0178913 A1 * | 7/2010 | Herbert et al. ............. | 455/426.1 |
| 2010/0330961 A1 * | 12/2010 | Rogel ........................... | 455/411 |
| 2011/0141276 A1 * | 6/2011 | Borghei ........................ | 348/143 |
| 2012/0032796 A1 * | 2/2012 | Jarrett et al. ............. | 340/539.11 |
| 2012/0081557 A1 * | 4/2012 | Kupinsky et al. .......... | 348/207.1 |

* cited by examiner

*Primary Examiner* — Mazda Sabouri
*Assistant Examiner* — Edward Zhang

(57) ABSTRACT

A method, non-transitory computer readable medium and apparatus for providing security on a mobile endpoint device are disclosed. For example, the method scans for a radio frequency signal, determines a state of the mobile endpoint device and triggers an alarm on the mobile endpoint device if the radio frequency signal is not detected for a predefined period of time and the state of the mobile endpoint device is an inactive state.

20 Claims, 3 Drawing Sheets

METHOD AND APPARATUS FOR MOBILE DEVICE SECURITY

This application is a continuation of U.S. patent application Ser. No. 13/447,967, filed Apr. 16, 2012, which is currently allowed and is herein incorporated by reference in its entirety.

The present disclosure relates generally to mobile device security and, more particularly, to a method and apparatus for detecting mobile device proximity to a user and associated security actions thereof.

BACKGROUND

The proliferation of mobile telephones and "smart phones" has made them a part of everyday life for most users. For example, users depend on the mobile telephones to store contact information, important documents, personal information, bank account information, schedules, and the like.

In addition, as the mobile telephones and smart phones become more sophisticated, the cost of these devices has steadily increased. As a result, users may suffer security and financial consequences if they lose their mobile telephone or smart phone.

SUMMARY

In one embodiment, the present disclosure provides a method for providing security on a mobile endpoint device. For example, the method scans for a radio frequency signal, determines a state of the mobile endpoint device and triggers an alarm on the mobile endpoint device if the radio frequency signal is not detected for a predefined period of time and the state of the mobile endpoint device is an inactive state.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for providing security on a mobile endpoint device. The rise in the use of mobile endpoint devices, such as smart phones, has become so prolific that many users rely heavily on their mobile endpoint device for communications, productivity and entertainment. As a result, users cannot afford to lose or misplace their mobile endpoint device and risk losing or exposing all of their personal contact information, email messages, financial information, stored documents, and the like.

Currently, there is no simple and practical way for a mobile endpoint device to alert a user that he is walking away from his mobile endpoint device and is about to leave his mobile endpoint device behind. Rather, most technology today is used to help locate a mobile endpoint device after the fact, that is, the user has realized that he has lost his mobile endpoint device and then may use an application to attempt to locate his mobile endpoint device. One embodiment of the present disclosure attempts to prevent users from losing their mobile endpoint device.

Figure 1:
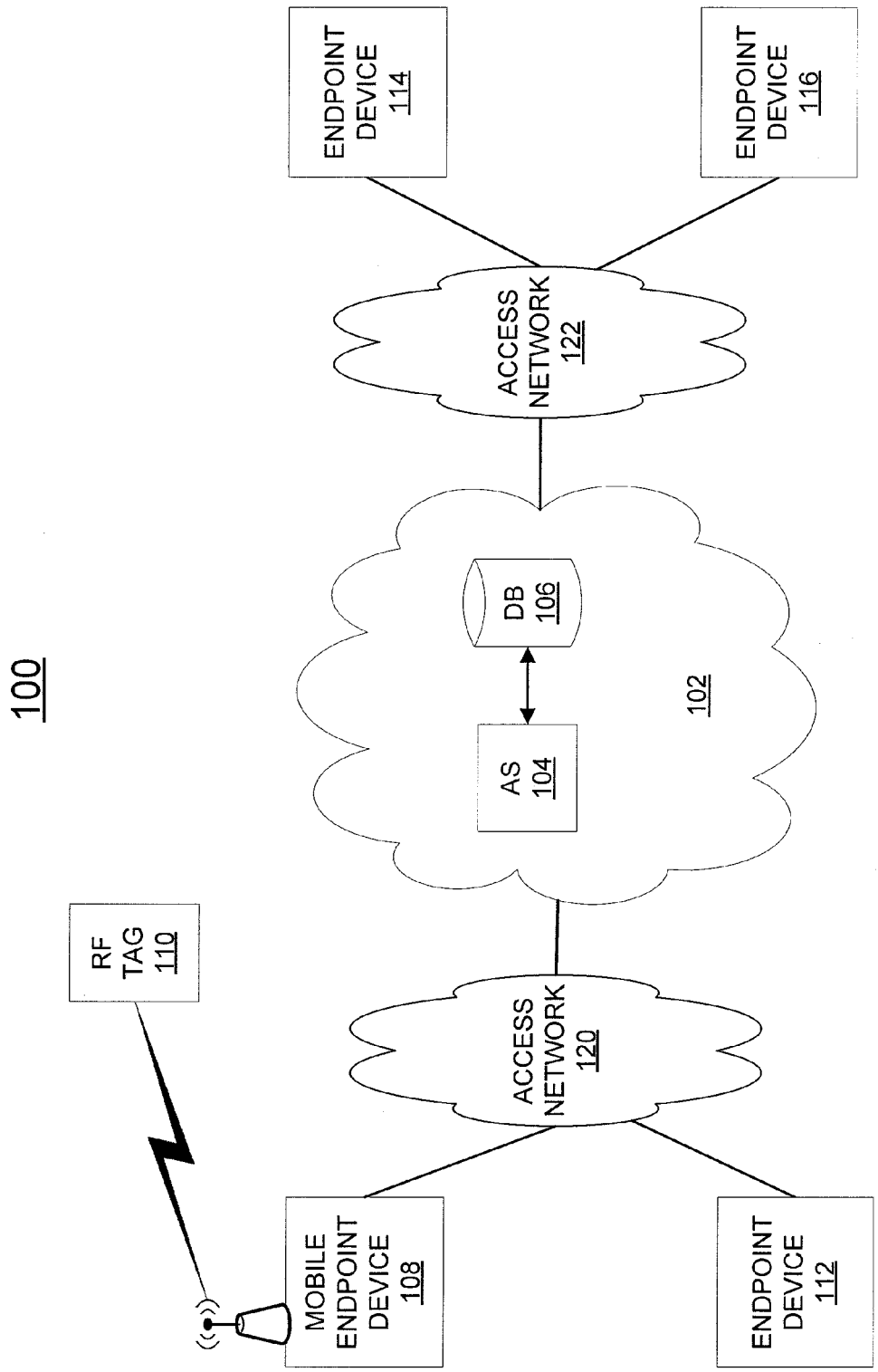
FIG. 1 illustrates one example of a communications network of the present disclosure.

FIG. 1 is a block diagram depicting one example of a communications network 100. The communications network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network, an asynchronous transfer mode (ATM) network, a wireless network, a cellular network (e.g., 2G, 3G, and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 3:
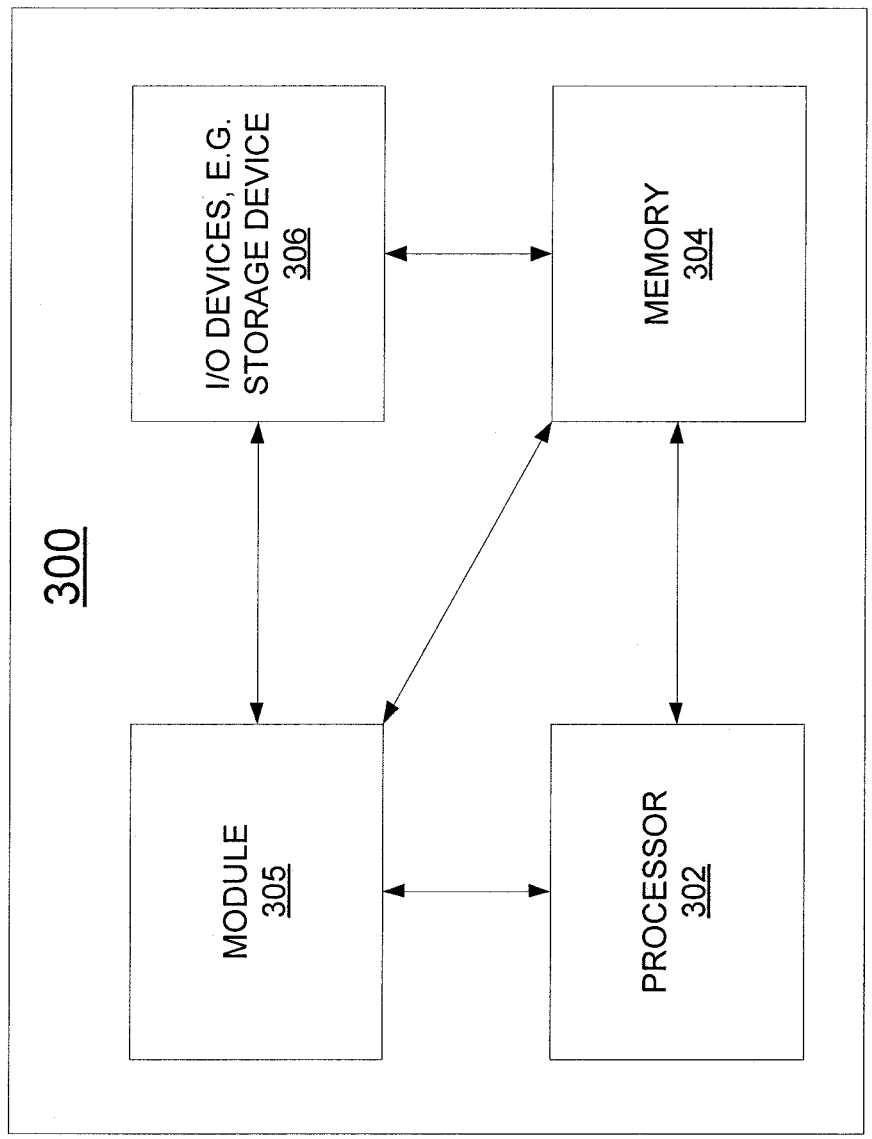
FIG. 3 illustrates a high-level block diagram of a general-purpose computer suitable for use in performing the functions described herein.

In one embodiment, the AS 104 may comprise a general purpose computer as illustrated in FIG. 3 and discussed below. In one embodiment, the DB 106 may store personal information of the subscribers of the communication network 100. In addition, the DB 106 may store secondary endpoint device information for a subscriber and endpoint device information associated with an alternate contact person for the subscriber, as discussed below.

In one embodiment, the access network 120 may be in communication with one or more user endpoint devices (also referred to as "endpoint devices") 108 and 112. In one embodiment, the access network 122 may be in communication with one or more endpoint devices 114 and 116.

It should be noted that the network 100 has been simplified. For example, the network 100 may include other network elements (not shown) such as border elements, routers, switches, policy servers, security devices, gateways, a content distribution network (CDN) and the like.

In one embodiment, the endpoint device 108 may be a mobile endpoint device such as a cellular telephone, a smart phone, a tablet computer, a laptop computer, a netbook, a portable media device (e.g., an iPod® touch or MP3 player), and the like. In one embodiment, the endpoint device 108 may be configured with near field communications (NFC) capability, e.g., a reader such as an RF reader to receive a signal from a passive or active RF tag. For example, the NFC may be built into the endpoint device 108 or may be an attachment to the endpoint device. In one embodiment, the endpoint devices 112, 114 and 116 may be any type of endpoint devices including, for example, a PSTN telephone, a smart phone, a cellular telephone, a laptop, a tablet device, a desktop computer, and the like.

In one embodiment, the endpoint device 108 may be in communication with a passive radio frequency (RE) tag 110. The RF tag 110 may be any type of passive (or active in one embodiment) signaling device compatible with NFC. In one embodiment, the endpoint device 108 may be configured to be associated with a unique RF tag, e.g., the RF tag 110. In other words, the endpoint device 108 may be looking for a specific RF signal (or broadly a particular identification signal) from the RF tag 110. The endpoint device 108 would not try to read RF signals from other RF tags that were not registered with it.

In one embodiment, mobile endpoint device security may be provided by using a combination of the NFC capability of the endpoint device 108 and the RF tag 110. For example, when the endpoint device 108 is unable to read or detect the RF tag 110, the endpoint device 108 may assume that the user has lost the endpoint device 108 and take one or more security actions until the user can confirm that he has retrieved the endpoint device 108.

To illustrate by example, the RF tag 110 may be proximate to (e.g., located on or near) a user or subscriber of the endpoint device 108. For example, the RF tag 110 may be placed inside of a pant pocket of the user or a shirt pocket of the user where the user would typically carry his endpoint device. In another embodiment, the RF tag 110 may be located in an accessory of the user that holds the endpoint device 108. For example, the accessory may be a holster, a bag or a purse that the user may use to carry the endpoint device 108.

As discussed above, the endpoint device 108 is configured with NFC, either built-in or via an attachment. The endpoint device 108 may use the NFC to read the RF tag 110 or to receive an RF signal emitted by the RF tag 110. In one embodiment, the endpoint device 108 may check for an RF signal from the RF tag 110 continuously or periodically, for example, once a minute, once an hour and the like.

In one embodiment, near field communications may operate within a relatively short distance based on configuration of the near field communications device, for example within a few inches or less than twelve inches. As a result, by placing the RF tag 110 in a location where the user carries his endpoint device 108, the endpoint device 108 may receive the RF signal from the RF tag 110.

However, when the user removes the endpoint device 108 from the location where the user carries the endpoint device 108, the endpoint device 108 may be moved a distance away from the RF tag 110 and be out of range to receive a signal from the RF tag 110.

In one embodiment, if the endpoint device 108 is out of range of the RF tag 110 for a predefined period of time (e.g., 10 seconds, 30 minutes, 1 hour and the like), the endpoint device 108 may activate a security action.

In one embodiment, the endpoint device 108 may be removed to be used by the user. For example, the user may be making a telephone call, browsing the web, running an application (e.g., a game application or a productivity application such as a word processing application) or sending a text message. To ensure that the security action is not prematurely activated, the endpoint device 108 may require that the endpoint device 108 is out of range of the RF tag 110 and also in a state that is an inactive state.

In other words, the endpoint device 108 may also monitor its own state. If the endpoint device 108 is in an active state (e.g., being used by the user as discussed above) then the security action may not be activated even if the endpoint device 108 has been out of range of the RF tag 110 for greater than the predefined period of time. However, if the endpoint device 108 is in an inactive state (e.g., not being used by the user as discussed above) and has been out of range of the RF tag 110 for greater than the predefined period of time, then this may indicate that the user is about to lose or has lost his endpoint device 108 and the security action may be activated.

In one embodiment, the active state may be detected when a user is actively operating the endpoint device 108, e.g., making a telephone call, browsing the Internet, writing an email message, writing a text message, executing an application, opening a document and the like. In one embodiment, the active state may be detected using one or more of the sensors on the endpoint device 108. For example, if the endpoint device 108 detects movement via an accelerometer in the endpoint device 108 or detects the user's face via a camera on the endpoint device, then the endpoint device may be in an active state. In one embodiment, the active state may be any state other than a sleep mode.

In one embodiment, the inactive state may be when no activity has been detected on the endpoint device 108 for a predefined time period, for example, 5 minutes, 1 hour and the like. In one embodiment, the inactive state may be when the endpoint device 108 is idling with the screen off, powered down or in a "sleep" mode.

In one embodiment, the security action may include, for example, triggering an alarm, sending a communication with location information of the endpoint device, locking down the endpoint device and the like. In one embodiment, if the RF signal is not detected for a predefined time period and the mobile endpoint device 108 is in an inactive state, then one or more of the above security actions may be activated. It should be noted that the security actions described above are only examples and are not intended to be limiting. Other types of security actions may be used and are within the scope of the present disclosure.

For example, the alarm may be an audible notification (e.g., beeping, ringtones, vibrating, etc.) or customized voice memo to alert the users that they are leaving their endpoint device behind. To illustrate, the user may leave his endpoint device on a table in the restaurant. As he is leaving, the endpoint device 108 does not detect the RF signal for the predefined period of time and the mobile endpoint device 108 is in an inactive state. As a result, the endpoint device 108 begins beeping loudly to alert the user that he has left his endpoint device. As a result, the user returns to retrieve the endpoint device. Alternatively, the alarm may be a customized voice memo recorded by the user. For example, the user may record a voice memo "Jane Doe, don't leave your phone!" As a result, the endpoint device may play this customized voice memo when the alarm is triggered.

In one embodiment, the communication may be a message (e.g., a text message, an email message) or an automated telephone call. In one embodiment, the message may include a multimedia attachment. For example, the endpoint device 108 may take a photo, record a video clip and/or record a sound clip of its surroundings. The photo, video clip and/or the sound clip may be sent as an attachment with the message. As a result, clues about the surroundings of where the endpoint device 108 is located may help a user determine where the endpoint device 108 is located. In one embodiment, the endpoint device 108 may take the photo, record the video clip and/or record the sound clip periodically until it is confirmed that the user has recovered the endpoint device 108. As a result, in case the endpoint device 108 is moved or stolen, the photo, video clip and/or the sound recording would help to track its surroundings as it changes. In one embodiment, the location information may include global positioning satellite (GPS) coordinates or an address (e.g., based on correlated coordinates (e.g., GPS coordinates) to map information) of where the endpoint device 108 is physically located.

In one embodiment, the communication may be sent to a secondary endpoint of the user. For example, the secondary endpoint device 112 may be a home desktop computer of the user and/or the secondary endpoint device 114 may be a home telephone. As a result, the endpoint device 108 may send an email message or a text message to the endpoint device 112 with the location information or may send an automated telephone call to the endpoint device 114 including the location information.

In one embodiment, the communication may be sent to an alternate contact predefined by the user. For example, the user may know that he is going out with his spouse for dinner. As a result, the user predefines his spouse as an alternate contact and includes a telephone number of his spouse's endpoint, e.g., the endpoint device 116. This information may be stored in a local memory of the endpoint device 108 or in the network in the DB 106. As a result, the endpoint device 108 may send a text message or a telephone call having the location information to the endpoint 116 of the user's spouse. Using the above example, as the user is leaving the restaurant with his spouse, the endpoint device 108 may text message the endpoint device 116 of the user's spouse. The spouse may then notify the user that he has left his endpoint device 108 behind at the restaurant and the user may go back to retrieve his endpoint device 108.

In one embodiment, the endpoint device 108 may send a communication to a network service provider of the endpoint device 108. For example, the endpoint device 108 may send a communication to the AS 104. The AS 104 may look up the user's secondary endpoint device information and/or the user's alternate contact information in the DB 106. Then the AS 104 may proceed to contact the user's secondary endpoint devices and/or the user's alternate contact as described above.

In one embodiment, the endpoint device 108 may lock itself down as a security action. For example, only 911 calls may be made with the endpoint device 108, but no other services, features or applications may be accessed.

In one embodiment, all of the security actions may be activated simultaneously. In another embodiment, the security actions may be activated in gradations based upon multiple predefined time periods of not receiving an RF signal from the RF tag 110.

For example, if no RF signal is received within a first predefined time period (e.g., 10 second) and the endpoint device 108 is in an inactive state, then endpoint device 108 may trigger an alarm. If no RF signal is received within a second predefined time period (e.g., 30 minutes) and the endpoint device 108 is still in an inactive state, then the endpoint device 108 may send a message with location information using any one of the methods discussed above. If no RF signal is received within a third predefined time period (e.g., 1 hour) and the endpoint device 108 is still in an inactive state, then the endpoint device may lock itself down and so forth.

In one embodiment, the security actions may stay activated until a user has confirmed that he has retrieved the endpoint device 108. For example, the confirmation may include entering a security code, entering a password, providing an answer to a security question and the like via the endpoint device 108. Once the confirmation is received, the endpoint device 108 may deactivate any security action that was activated.

In one embodiment, the security actions may be configurable by the user. In other words, the user may turn the security actions on or off at any time. For example, the user may be studying at a library and has his endpoint device out on a table out of range of the RF tag 110. As a result, to prevent the security actions from being activated while the user is not using the endpoint device 108, the user may turn off the security actions on the endpoint device 108.

In one embodiment, the security actions may be turned off for a predefined period of time. Using the above example, the user may know that he will be studying for approximately two hours. However, after studying for two hours the user may have a greater chance of forgetting his endpoint device 108 on the table. As a result, the user may set the predefined period of time to two hours for turning off the security actions. Once the two hours have elapsed, the endpoint device 108 may activate one or more of the security actions if no RF signal is received for a predetermined time period and the endpoint device 108 is in an inactive state.

For example, if the predefined period of time for detecting the RE signal is 10 seconds, after two hours the endpoint device 108 would begin scanning for the RF signal. One or more security actions may be activated if no signal is detected after 10 second after the two hour period of time set by the user and the endpoint is in an inactive state.

As a result, embodiments of the present disclosure help to prevent a user from leaving his endpoint device or losing his endpoint device and implementing security features if the endpoint device is left behind or lost. In other words, embodiments of the present disclosure attempt to proactively prevent a user from losing his endpoint device, rather than simply helping to find the endpoint device after the fact.

Figure 2:
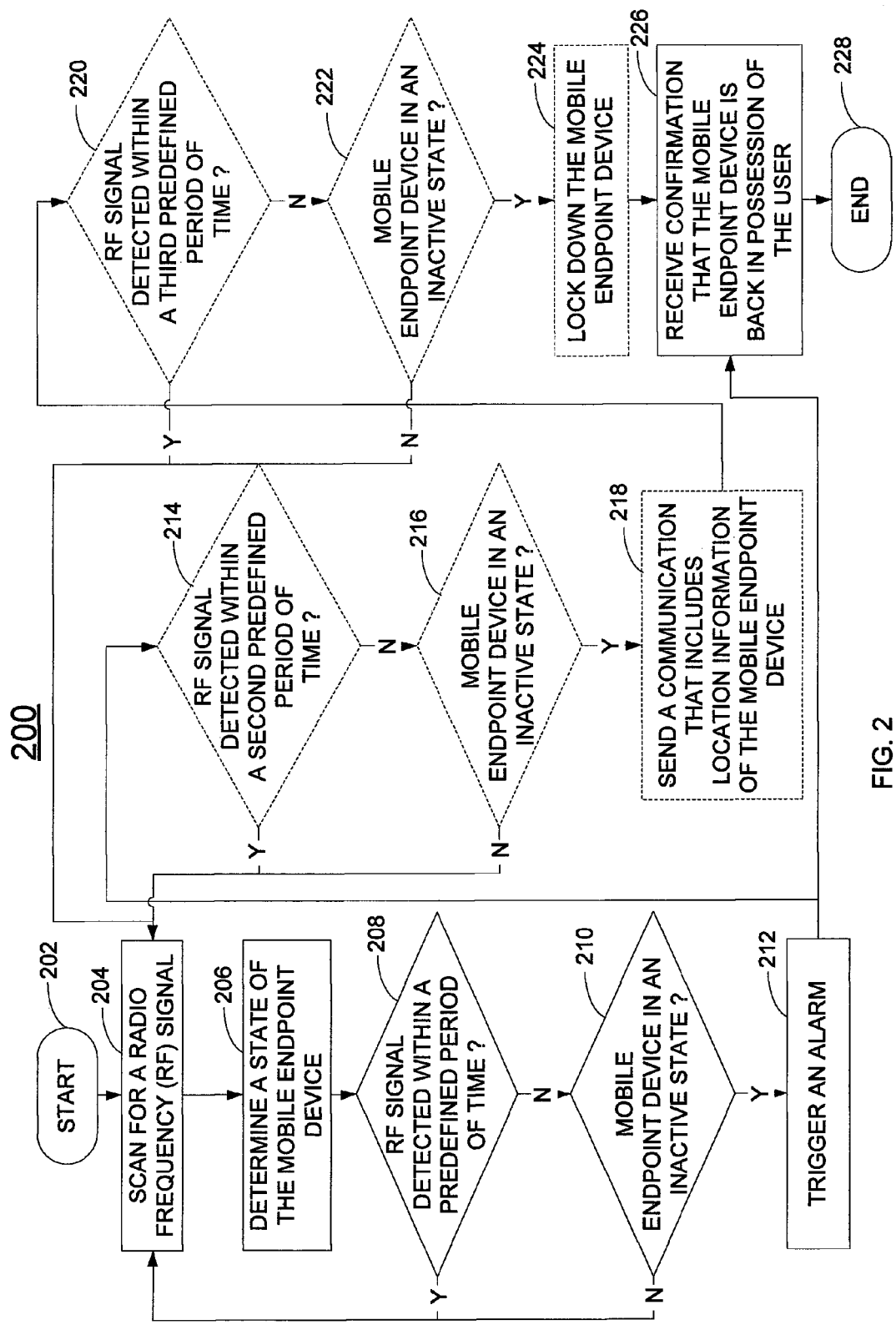
FIG. 2 illustrates an example flowchart of one embodiment of a method for providing security on a mobile endpoint device.

FIG. 2 illustrates a flowchart of a method 200 for providing security on a mobile endpoint device. In one embodiment, the method 200 may be performed by the endpoint device 108 having NFC capabilities or a general purpose computing device having NFC capabilities as illustrated in FIG. 3 and discussed below.

The method 200 begins at step 202. At step 204, the method 200 scans for an RF signal. For example, a user may place a passive RF tag in a location where he carries his mobile endpoint device, such as his pant pocket, a holster, a purse and the like. In one embodiment, the mobile endpoint device scans for the RF signal emitted by the passive RF tag via the mobile endpoint device's NFC capability to ensure that the mobile endpoint device is in the possession of the user. In one embodiment, the passive RF tag is registered with the mobile endpoint device such that the mobile endpoint device is only scanning for a particular RF signal.

In one embodiment, the mobile endpoint device may scan continuously. In another embodiment, the mobile endpoint device may scan periodically, for example, once a minute, once an hour and the like.

At step 206, the method 200 determines a state of the mobile endpoint device. For example, the mobile endpoint device may be in an active state or in an inactive state. In one embodiment, the active state may be when a user is operating the mobile endpoint device, e.g., making a telephone call, browsing the Internet, writing an email message, writing a text message, executing an application, opening a document and the like. For example, if the mobile endpoint device detects movement via an accelerometer in the mobile endpoint device or detects the users face via a camera on the endpoint device, then the endpoint device may be in an active state. In one embodiment, the active state may be any state other than a sleep mode.

In one embodiment, the inactive state may be when no activity has been detected on the mobile endpoint device for a predefined time period, for example, 5 minutes, 1 hour and the like. In one embodiment, the inactive state may be when the mobile endpoint device is powered down, in an "idle" mode or in a "sleep" mode.

At step 208, the method 200 determines if the RF signal was detected within a predefined period of time. If the RF signal was detected, the method 200 loops back to step 204 to scan for the RF signal.

However, if no RF signal was detected, the method 200 proceeds to step 210. At step 210, the method 200 determines if the mobile endpoint device is in an inactive state. If the mobile endpoint device is not in an active state (e.g., the user is operating the mobile endpoint device), then the method loops back to step 204 to scan for the RE signal. However, if the mobile endpoint device is in an inactive state, then the method 200 proceeds to step 212.

At step 212, the method 200 activates a security action, e.g., triggers an alarm. This is because at step 208 and step 210, the method 200 determined that no RF signal was detected within the predefined period of time and that the mobile endpoint device is in an inactive state. The alarm may be an audible alarm as described above.

In one embodiment, the method 200 may also activate other security actions at step 212 simultaneously with the triggering of the alarm. Any of the security actions described above may be activated.

In one embodiment, the method 200 may activate other security actions on a graduated basis via optional steps 214-224. If the optional steps 214-224 are not performed, then the method 200 may proceed to step 226.

At step 226, the method 200 receives a confirmation that the mobile endpoint is back in the possession of the user. For example, the confirmation may include entering a security code, entering a password, providing an answer to a security question and the like via the mobile endpoint device. Once the confirmation is received, the mobile endpoint device may deactivate any security action that was activated.

However, if the optional steps 214-224 are performed, from step 212 the method 200 may proceed to step 214. At step 214, the method 200 determines if an RF signal was detected within a second predefined period of time. In one embodiment, the second predefined period of time may be a longer period of time than the period of time in step 208. For example, the predefined period of time for step 208 may be relatively short such as 15 seconds. The second predefined period of time may be longer, for example, 30 minutes.

If an RF signal was detected at step 214, then the method 200 proceeds back to step 204 to scan for an RF signal. However, if no RF signal was detected then the method 200 proceeds to step 216.

At step 216, the method 200 determines if the mobile endpoint device is in an inactive state. If the mobile endpoint device is not in an inactive state, then the method 200 proceeds back to step 204 to scan for an RF signal. However, if the mobile endpoint device is in an active state, the method 200 proceeds to step 218.

At step 218, the method 200 may send a communication that includes location information of the mobile endpoint device. For example, if the user did not return to pick up his mobile endpoint device after step 212, the mobile endpoint device may determine that it is lost and attempts to notify the user via a message with location information such as an address or GPS coordinates. As discussed above, the communication may be a text message, an email message or an automated telephone call to an alternate endpoint device of the user, to an alternate contact or to the network service provider.

At step 220, the method 200 determines if an RF signal was detected within a third predefined period of time. In one embodiment, the third predefined period of time may be a longer period of time than the period of time in step 208 and the second predefined period of time in step 214. For example, the third predefined period of time may be 1 hour.

If an RF signal was detected at step 220, then the method 200 proceeds back to step 204 to scan for an RF signal. However, if no RF signal was detected then the method 200 proceeds to step 222.

At step 222, the method 200 determines if the mobile endpoint device is in an inactive state. If the mobile endpoint device is not in an inactive state, then the method 200 proceeds back to step 204 to scan for an RF signal. However, if the mobile endpoint device is in an active state, the method 200 proceeds to step 224.

At step 224, the method 200 may lock down the mobile endpoint device. For example, only 911 calls may be made with the endpoint device 108, but no other services, features or applications may be accessed.

The method 200 then may proceed to step 226. At step 226, as noted above, the method 200 receives a confirmation that the mobile endpoint is back in the possession of the user. For example, the confirmation may include entering a security code, entering a password, providing an answer to a security question and the like via the mobile endpoint device. Once the confirmation is received, the mobile endpoint device may deactivate any security action that was activated. The method 200 ends at step 228.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a hardware processor element 302 (e.g., a CPU), a memory 304, e.g., random access memory (RAM) and/or read only memory (ROM), a module 305 for providing security on a mobile endpoint device, and various input/output devices 306, e.g., near field communications capability, an accelerometer, a gyro, a camera, a light sensor, a microphone, a compass, pressure sensor, a temperature sensor, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 305 for providing security on a mobile endpoint device can be loaded into memory 304 and executed by hardware processor 302 to implement the functions as discussed above. As such, the present method 305 for providing security on a mobile endpoint device as discussed above in method 200 (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for triggering an alarm on a mobile endpoint device, the method comprising:
   scanning, by a processor, for a radio frequency signal, wherein the radio frequency signal is emitted by a radio frequency tag located proximate to a user of the mobile endpoint device;
   determining, by the processor, a state of the mobile endpoint device; and
   triggering, by the processor, the alarm on the mobile endpoint device when the radio frequency signal is not detected for a predefined period of time due to the radio frequency tag being moved out of range of the mobile endpoint device and only when the state of the mobile endpoint device is an inactive state.

2. The method of claim 1, wherein the scanning is performed by a near field communications reader on the mobile endpoint device.

3. The method of claim 1, wherein the alarm comprises an audible notification.

4. The method of claim 1, further comprising:
   sending a communication that includes location information of the mobile endpoint device.

5. The method of claim 4, wherein the communication is sent to an alternate endpoint device of a user.

6. The method of claim 4, wherein the communication is sent to an alternate contact that is predefined by a user.

7. The method of claim 4, wherein the communication is sent to a network service provider and the network service provider is tasked with contacting a user of the mobile endpoint device.

8. The method of claim 4, wherein the communication comprises a message.

9. The method of claim 8, wherein the message includes a multimedia attachment.

10. The method of claim 4, wherein the communication comprises an automated telephone call.

11. The method of claim 4, further comprising:
    when the radio frequency signal is not detected for a second predefined period of time and the state of the mobile endpoint device is the inactive state, locking the mobile endpoint device.

12. A non-transitory computer-readable medium storing a plurality of instructions which, when executed by a processor, cause the processor to perform operations for triggering an alarm on a mobile endpoint device, the operations comprising:
    scanning for a radio frequency signal, wherein the radio frequency signal is emitted by a radio frequency tag located proximate to a user of the mobile endpoint device;
    determining a state of the mobile endpoint device; and
    triggering the alarm on the mobile endpoint device when the radio frequency signal is not detected for a predefined period of time due to the radio frequency tag being moved out of range of the mobile endpoint device and only when the state of the mobile endpoint device is an inactive state.

13. The non-transitory computer-readable medium of claim 12, wherein the scanning is performed by a near field communications reader on the mobile endpoint device.

14. The non-transitory computer-readable medium of claim 12, further comprising:
    sending a communication that includes location information of the mobile endpoint device.

15. The non-transitory computer-readable medium of claim 14, wherein the communication is sent to an alternate endpoint device of a user.

16. The non-transitory computer-readable medium of claim 14, wherein the communication is sent to an alternate contact that is predefined by a user.

17. The non-transitory computer-readable medium of claim 14, wherein the communication is sent to a network service provider and the network service provider is tasked with contacting a user of the mobile endpoint device.

18. An apparatus for triggering an alarm on a mobile endpoint device, the apparatus comprising:
    a processor; and
    a computer-readable medium storing a plurality of instructions which, when executed by the processor, cause the processor to perform operations, the operations comprising:
       scanning for a radio frequency signal, wherein the radio frequency signal is emitted by a radio frequency tag located proximate to a user of the mobile endpoint device;
       determining a state of the mobile endpoint device; and
       triggering the alarm on the mobile endpoint device when the radio frequency signal is not detected for a predefined period of time due to the radio frequency tag being moved out of range of the mobile endpoint device and only when the state of the mobile endpoint device is an inactive state.

19. The apparatus of claim 18, wherein the alarm comprises an audible notification.

20. The apparatus of claim 18, the operations further comprising:
    sending a communication that includes location information of the mobile endpoint device.

* * * * *